United States Patent
Jain

(10) Patent No.: US 7,480,268 B2
(45) Date of Patent: Jan. 20, 2009

(54) SYSTEM AND METHOD FOR MULTIPROTOCOL WIRELESS COMMUNICATION

(75) Inventor: Amit Jain, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 393 days.

(21) Appl. No.: 11/191,296

(22) Filed: Jul. 28, 2005

(65) Prior Publication Data

US 2007/0025390 A1   Feb. 1, 2007

(51) Int. Cl.
*H04Q 7/00*   (2006.01)
*H04L 12/43*   (2006.01)
*G06F 7/00*   (2006.01)

(52) U.S. Cl. ............... 370/328; 370/458; 707/104.1
(58) Field of Classification Search ............ 707/104.1; 370/458, 328
See application file for complete search history.

(56) References Cited

U.S. PATENT DOCUMENTS

| | | | |
|---|---|---|---|
| 2003/0083095 A1 | 5/2003 | Liang | |
| 2003/0181213 A1 | 9/2003 | Sugar et al. | |
| 2005/0075130 A1 | 4/2005 | Godfrey | |
| 2006/0123053 A1* | 6/2006 | Scannell, Jr. | 707/104.1 |
| 2007/0025390 A1* | 2/2007 | Jain | 370/458 |

FOREIGN PATENT DOCUMENTS

EP   1 515 494   3/2005

* cited by examiner

*Primary Examiner*—William D Cumming
(74) *Attorney, Agent, or Firm*—Fay Kaplun & Marcin, LLP

(57) ABSTRACT

A method compares a plurality of wireless protocols utilized on a radio frequency channel. Each wireless protocol utilizes a corresponding predetermined number of subcarrier frequencies on the channel. A number is generated as a function of a comparison of the corresponding predetermined numbers. The frequency channel is divided by the number to generate a set of subcarrier frequencies. Each of the wireless protocols is assigned to a corresponding subset of subcarrier frequencies. Wireless communications are conducted over each subset of subcarrier frequencies utilizing the corresponding wireless protocol during a same time period.

15 Claims, 6 Drawing Sheets

US 7,480,268 B2

SYSTEM AND METHOD FOR MULTIPROTOCOL WIRELESS COMMUNICATION

BACKGROUND

In a conventional wireless network, wireless communication of data between an access point ("AP") and a first wireless station ("STA") utilizes a single wireless protocol (e.g., an IEEE 802.1X protocol) over a preselected radio frequency ("RF") channel. In the network, a second STA utilizing a second wireless protocol is prevented from conducting wireless communication over the same frequency channel. This is due to mutual interference between the two wireless protocols used in this case. That is, the network does not support wireless communications utilizing more than one protocol over the same RF channel.

One conventional method of simultaneously communicating utilizing the first and second wireless protocols is to use separate RF channels for each protocol. In the above example, the first STA would transmit signals utilizing its wireless protocol over a first RF channel, while the second STA transmits signals utilizing its wireless protocol over a second RF channel. However, the method inefficiently utilizes the RF channels available for communication and may result in increased costs for licensed usage of a spectrum. As a number of simultaneous communications via different wireless protocols increases, there presents a need for providing simultaneous communications utilizing multiple wireless protocols on the same RF channel.

SUMMARY OF THE INVENTION

The present invention relates to a method which compares a plurality of wireless protocols utilized on a radio frequency channel. Each wireless protocol utilizes a corresponding predetermined number of subcarrier frequencies on the channel. A number is generated as a function of a comparison of the corresponding predetermined numbers. The frequency channel is divided by the number to generate a set of subcarrier frequencies. Each of the wireless protocols is assigned to a corresponding subset of subcarrier frequencies. Wireless communications are conducted over each subset of subcarrier frequencies utilizing the corresponding wireless protocol during a same time period.

DETAILED DESCRIPTION

Figure 1:
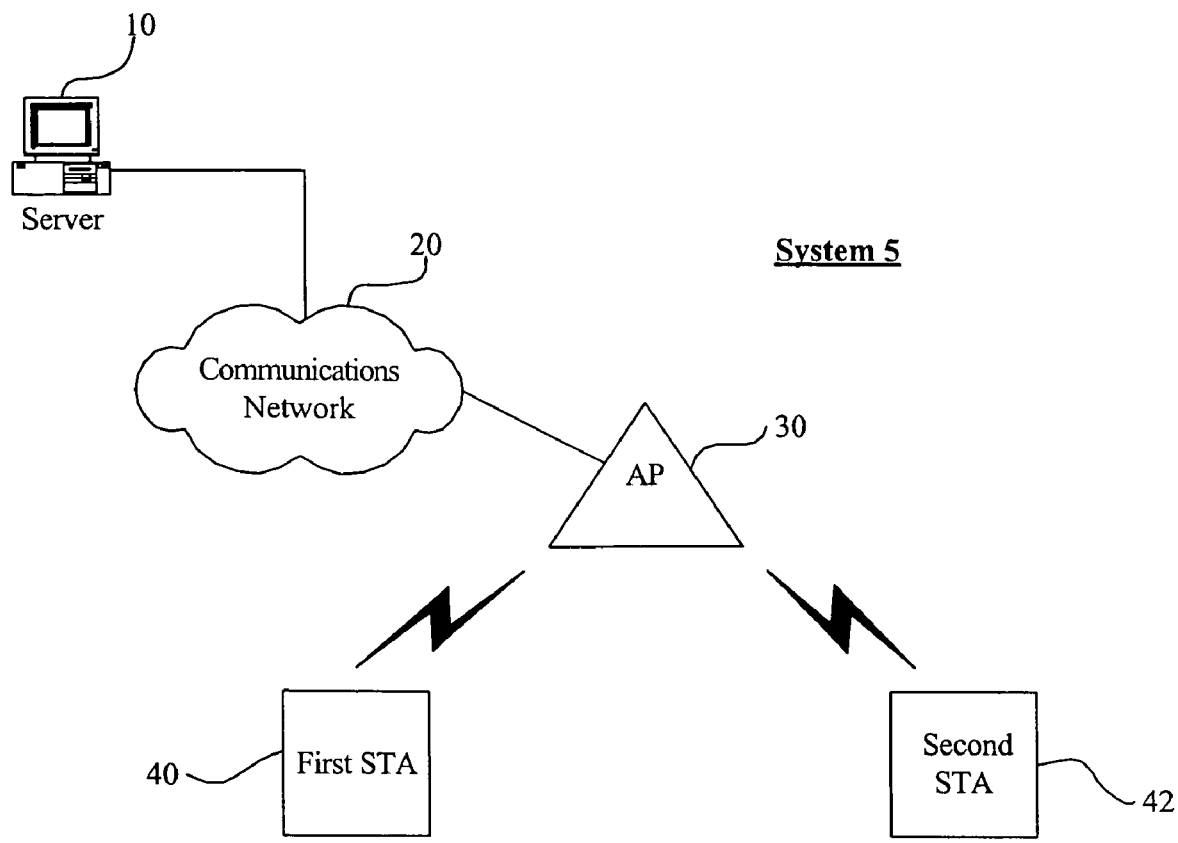
FIG. 1 shows an exemplary embodiment of a system according to the present invention.

The present invention may be further understood with reference to the following description and the appended drawings, wherein like elements are referred to with the same reference numerals. An exemplary embodiment of the present invention describes a system and method for wireless communication utilizing a plurality of wireless protocols on a same radio frequency ("RF") channel. The present invention further describes wireless communication devices which support the wireless communication according to the system of the present invention.

FIG. 1 shows an exemplary embodiment of a system 5 according to the present invention. The system 5 may include a computing device (e.g., a server 10) coupled to an access point ("AP") 30 via a communications network 20. The system 100 may further include a first wireless station ("STA") 40 and a second STA 42 which are in wireless communication with the AP 30. Although FIG. 1 shows only the first and second STAs 40, 42 in wireless communication with the AP 30, those of skill in the art will understand that the system 100 may include any number and type of STAs. For example, each STA may be either a PDA, laptop, network interface card, handheld computer, etc. Also, the system 5 may include one or more further APs connected to the communications network 20.

The communications network 20 may include one or more network computing devices (e.g., a switch, a router, etc.) and/or any hardware/software arrangement(s) which direct a path of a transmission between any devices coupled thereto. For example, the communications network 20 may direct the transmission from the server 10 to the AP 30, and vice-versa.

The server 10 may communicate with the first and second STAs 40, 42 via the communications network 20 and the AP 30. In one embodiment, the server 10 may be a remote authentication dial in user service ("RADIUS") server which authenticates the first and second STAs 40, 42 by responding to an authentication request transmitted therefrom. If, for example, the authentication request is granted, the first and second STAs 40, 42 may access the server 10 and/or any device coupled to the communications network 20. In addition, the server 10 may fulfill a data request from the AP 30 and/or the first and second STAs 40, 42. For example, the first STA 40 may request information from a database stored in or coupled to the server 10. The server 10 may further communicate with other devices (e.g., switches, routers, desktop computers, etc.) connected to the communications network 20.

Figure 2:
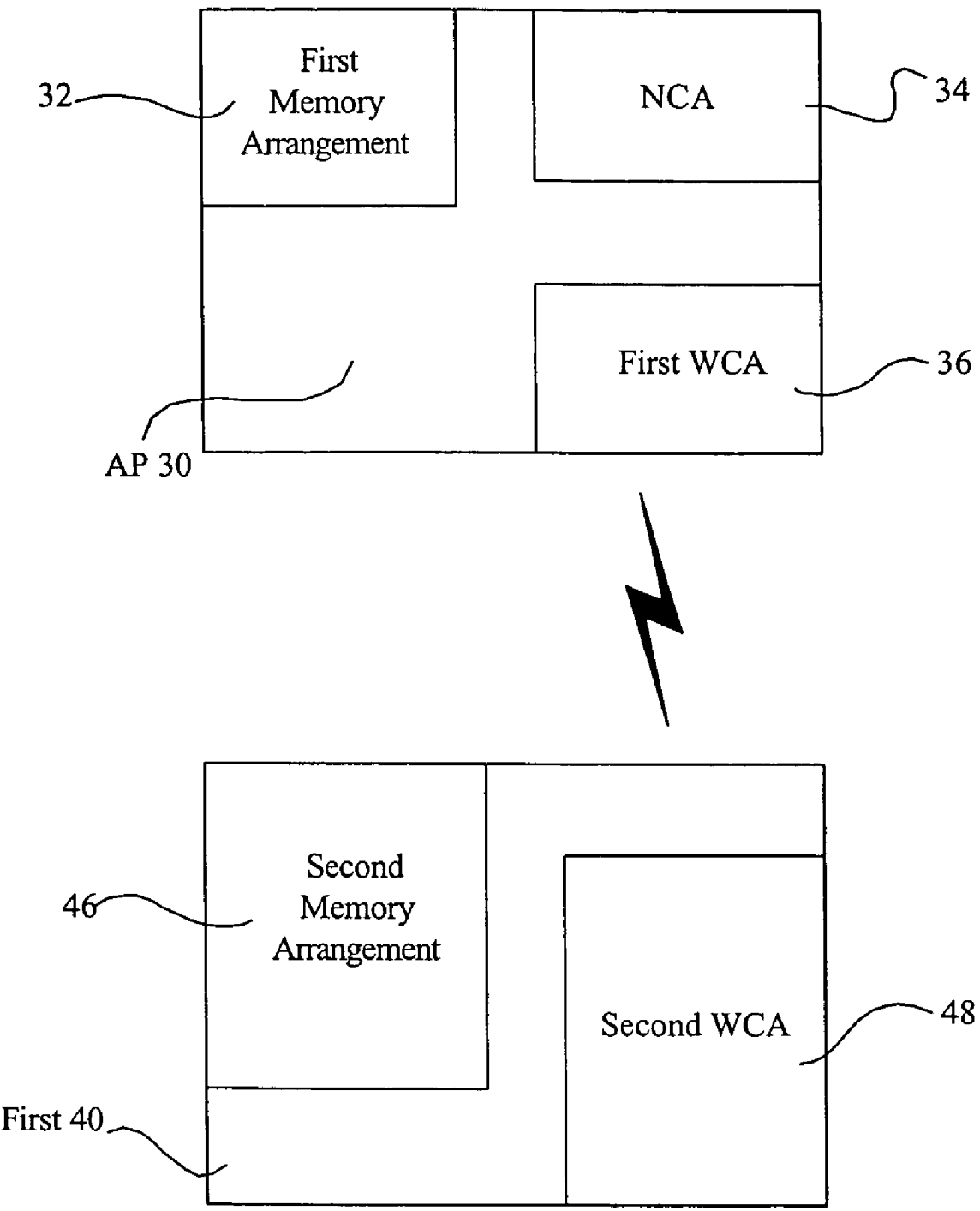
FIG. 2 shows an exemplary embodiment of an access point and a wireless station according to the present invention.

FIG. 2 shows an exemplary embodiment of the AP 30 and the first STA 40 according to the present invention. Those of skill in the art will understand that the second STA 42 and any further STA present in the system 5 may have a similar architecture to that of the first STA 40.

The AP 30 may include a first memory arrangement 32, a network communication arrangement ("NCA") 34, and a first wireless communication arrangement ("WCA") 36. The memory arrangement 32 may be any conventional storage device capable of being written to and read from. Examples of the memory arrangement 32 include, but are not limited to, a static random access memory ("SRAM"), an erasable programmable read-only memory ("EPROM"), and other similar arrangements. In addition, the memory arrangement 32 may include a volatile and/or a non-volatile memory. According to the present invention, the memory arrangement 32 may store one or more wireless protocols, such as, for example, an IEEE 802.1X protocol(s). In particular, the wireless protocols may be an 802.11 protocol (e.g., 802.11a) and/or an 802.16 protocol (e.g., 802.16d, 802.16e).

The NCA 34 allows the AP 30 to be coupled and have access to the communication network 20 via a wired connection thereto. For example, the NCA 34 may include one or more conventional hardware ports (e.g., universal serial bus, Ethernet, serial, etc.) which receive the wired connection. In another embodiment, the AP 30 may be connected directly to the server 10 via the NCA 34. Other configurations of the AP 30, the server 10 and the communications network 20 may be possible and will be apparent to those skilled in the art. Further, other configurations of the AP 30 itself (i.e., components therein) may be modified.

The first WCA 36 provides for wireless communication between the AP 30 and the first STA 40 over an RF channel having a predetermined bandwidth (e.g., 20 MHz). The first WCA 36 may include one or more antennas, one or more transmitters, one or more receivers, and/or a controller which directs the communication of RF signals between the AP 30 and the first STA 40 in accordance with the wireless protocol(s) stored in the first memory arrangement 32.

An exemplary embodiment of the first STA 40 is also shown in FIG. 2. The first STA 40 may include a second memory arrangement 46 and a second WCA 48. The memory arrangement 46 may be any conventional storage device capable of being written to and read from. Examples of the second memory arrangement 46 include, but are not limited to, SRAM, EPROM, and other similar arrangements. In addition, the second memory arrangement 46 may comprise a volatile and/or a non-volatile memory. According to the present invention, the second memory arrangement 46 further includes one or more wireless protocols stored thereon. Examples of a wireless protocol include, but are not limited to, the 802.11 protocol (e.g., 802.11a) and/or the 802.16 protocol (e.g., 802.16d, 802.16e). Preferably, any wireless protocol which is utilized by the first STA 40 is also utilized by the AP 30.

The second WCA 48 provides for wireless communication of RF signals between the first STA 40 and the AP 30. The second WCA 48 may include one or more antennas, one or more transmitters, one or more receivers, a network interface card, and a controller which directs the communication of the RF signals between the first STA 40 and the AP 30 in accordance with the wireless protocol(s) stored in the second memory arrangement 46. Thus, the first STA 40 may communicate with the AP 30 by sending and receiving the RF signals over the RF channel.

According to the present invention, the first STA 40 may utilize a first wireless protocol (e.g., 802.16d/e) while the second STA 42 may utilize a second wireless protocol (e.g., 802.11a). The first and second wireless protocols may present advantages over each in different applications. For example, the 802.11a protocol may be used for a Point-to-Multipoint ("PMP") but is more useful for a Point-to-Point ("PTP") communication, whereas the 802.16d/e protocol may be more useful for the PMP communication. As understood by those of skill in the art, the PTP communication may be generally used for a backhaul (e.g., data flow between the AP 30 and a further computing device receiving data from multiple APs and/or STAs). In a conventional system, the first and second STAs 40, 42 would be required to transmit on different (e.g., non-overlapping) RF channels for simultaneous operation, or else there would be mutual interference between transmissions therefrom. The interference may lead to signal degradation and increased system overhead due to, for example, failed and reattempted transmissions. Conventionally, the first and second STAs 40, 42 would utilize two, non-overlapping RF channels which would result in increased cost and system complexity.

Figure 3:
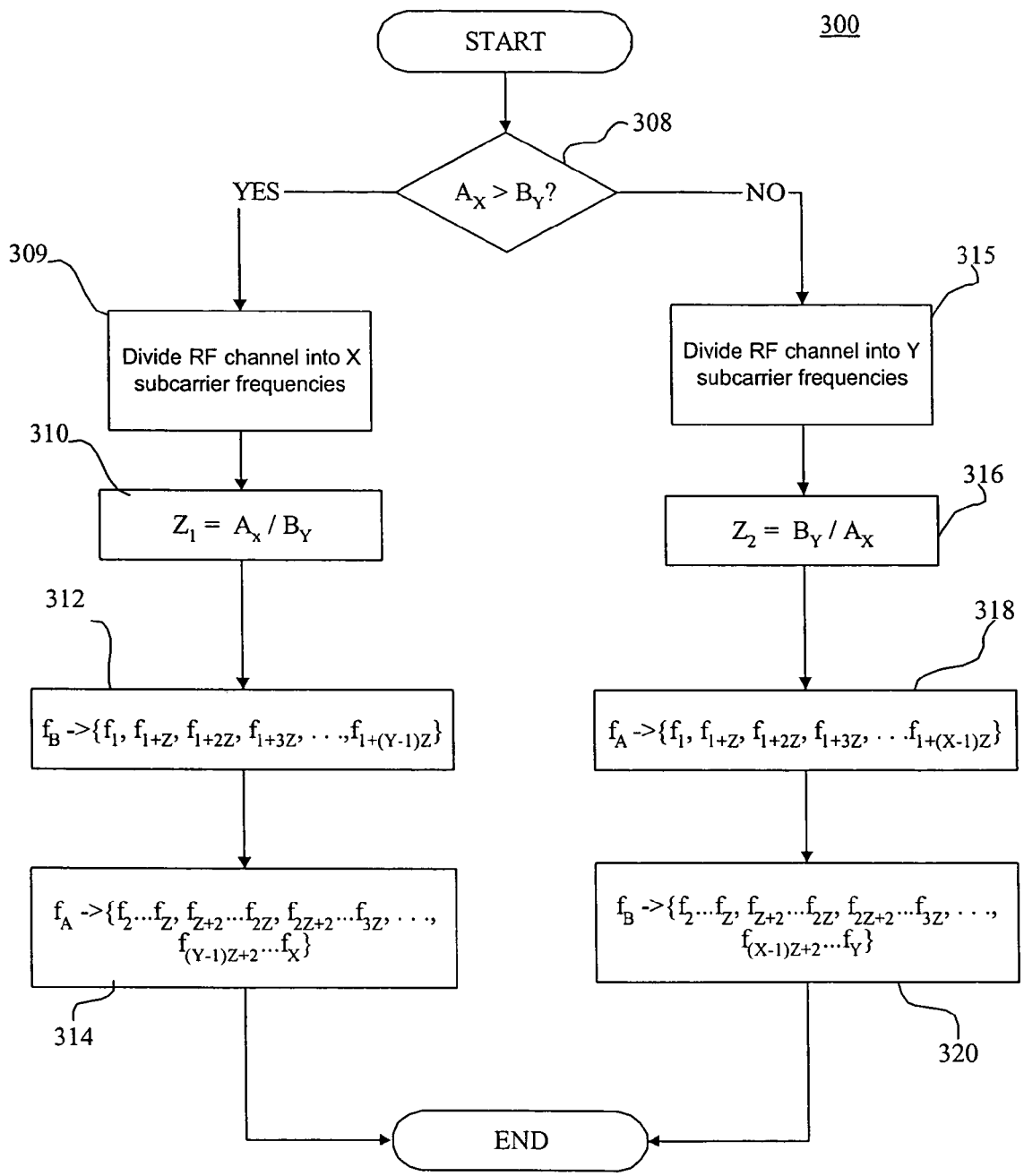
FIG. 3 shows an exemplary embodiment of a method for allocating a radio frequency channel according to the present invention.

An exemplary embodiment of a method 300 according to the present invention is shown in FIG. 3. The method 300 will be described with reference to the first STA 40 utilizing the first wireless protocol (e.g., the 802.16d/e protocol), while the second STA 42 utilizes the second wireless protocol (e.g., the 802.11a protocol). According to the present invention, the first and second STAs 40, 42 communicate over the same RF channel. As an illustrative example, the first STA 40 will utilize the 802.16d protocol and the second STA 42 will utilize the 802.11a protocol. However, those skilled in the art will realize that the present invention may be applied to any combination of two or more wireless protocols which utilize an orthogonal frequency division multiplexing ("OFDM") and/or an orthogonal frequency division multiple access ("OFDMA") technique, and will be used simultaneously on the same RF channel having any predetermined bandwidth.

Those of skill in the art will understand that the OFDM and OFDMA are modulation techniques utilized by the wireless protocols to divide the RF channel into a predetermined number of subcarrier frequencies. The predetermined number is unique to each wireless protocol. For example, the predetermined number for the 802.11a, 802.16d, and 802.16e protocols is 64, 256, and 2048, respectively. Thus, if the RF channel were to support wireless communication using only the 802.11a protocol, the RF channel would be divided into 64 subcarrier frequencies.

In step 308, the wireless protocols are compared to determine which of them would divide the RF channel into a greater number of subcarrier frequencies. That is, the first wireless protocol (shown as "A") would divide the RF channel into a first number X of subcarrier frequencies, while the second wireless protocol (shown as "B") would divide the RF channel into a second number Y of subcarrier frequencies. Those of skill in the art will understand that the comparison may be conducted for any two or more wireless protocols (e.g., 802.11a & 802.16d, 802.11a & 802.16e, 802.16d & 802.16e, 802.11a & 802.16d & 802.16e). In the illustrative example, the 802.16d protocol will divide the RF channel into 256 subcarrier frequencies, whereas the 802.11a protocol will divide the RF channel into 64 subcarrier frequencies. That is, the comparison may be depicted as "$802.16d_{256} > 802.11a_{64}$?".

As understood by those of skill in the art, the present invention may be implemented on any wireless device. For example, the method 300 may be executed by hardware and/or software on the first STA 40, the second STA 42 and/or the AP 30. That is, the wireless device must execute and/or be aware of the modification described herein. For example, if the AP 30 executes the modification, a result thereof must by conveyed to the first and second STAs 40, 42 and any other device communicating with the AP 30. Furthermore, in one embodiment, the modification may be executed prior to or during deployment of the system 5. In another embodiment, the modification is executed dynamically, during wireless communications in the system 5.

In step 309, because the first number X is greater than the second number Y, the RF channel is divided into a number of the subcarrier frequencies equaling the first number X. That is, in the illustrative example (e.g., the 802.16d and 802.11a protocols), the RF channel will be divided into 256 subcarrier frequencies.

In step 310, a first quotient $Z_1$ is generated to determine a predefined spacing (e.g., a subcarrier allocation ratio) between the first and second wireless protocols within the RF channel. That is, the first quotient $Z_1$ determines that the wireless protocol which utilizes a smallest number of subcarrier frequencies (e.g., the second wireless protocol B) will be utilized on one subcarrier frequency for every $Z_1$ subcarrier frequencies in the RF channel. The first quotient $Z_1$ is obtained by dividing the first number X by the second number Y. In the example, 256 is divided by 64 to yield 4 as the first quotient $Z_1$. Thus, for every 4 subcarrier frequencies, three will utilize the 802.16d protocol and one will utilize the 802.11a protocol. The subcarrier frequencies allocated to the wireless protocol with the smallest subcarrier frequencies (e.g., the second wireless protocol B) may generally be equidistant from each other, as will be explained below.

In step 312, the second wireless protocol B is assigned to a second set of subcarrier frequencies $f_B$. A first set of subcarrier frequencies $f_a$ is assigned to the first wireless protocol A, as described below. Beginning with a first subcarrier frequency $f_1$ within the RF channel, the first quotient $Z_1$ is added to the first subcarrier frequency $f_1$ in order to calculate a subsequent subcarrier frequency $f_{1+Z}$. Thus, the second set of subcarrier frequencies $f_B$ begins with $f_1, f_{1+Z}, f_{1+2Z}$, and $f_{1+3Z}$, and ends with $f_{1+(Y-1)Z}$. In this manner, the second set of subcarrier frequencies $f_b$ includes a total number of subcarrier frequencies equal to the second number Y. In the example, the second set of subcarrier frequencies $f_b$ is assigned to the subcarrier frequencies $f_1, f_5, f_9, f_{13}, \ldots, f_{253}$, which will utilize the 802.11a protocol. Thus, the second set includes 64 subcarrier frequencies.

In step 314, the first wireless protocol A is assigned a first set of subcarrier frequencies $f_A$. The first set of subcarrier frequencies $f_A$ includes each subcarrier frequency which was not assigned to the second wireless protocol B. In this manner, a total number of subcarrier frequencies assigned to the first wireless protocol A may equal a difference between the first number X and the second number Y (e.g., X−Y). Allocating the first set of subcarrier frequencies $f_A$ within the RF channel begins with a second subcarrier frequency $f_2$ and includes each subsequent subcarrier frequency up to subcarrier frequency $f_Z$, and so on. Thus, the first set of subcarrier frequencies $f_A$ begins with $f_2 \ldots f_Z, f_{Z+2} \ldots f_{2Z}$, and $f_{2Z+2} \ldots f_{3Z}$, and ends with $f_{(Y-1)Z+2} \ldots f_X$. In the example, the first set of subcarrier frequencies $f_A$ is assigned to be subcarrier frequencies $f_2 \ldots f_4, f_6 \ldots f_8, f_{10} \ldots f_{12}, \ldots f_{254} \ldots f_{256}$, which will utilize the 802.16d protocol. Thus, the first set includes 192 subcarrier frequencies.

Accordingly, the RF channel has been divided into the first set of subcarrier frequencies $f_A$ which provide for communication utilizing the first wireless protocol A and the second set of subcarrier frequencies $f_B$ which utilize the second wireless protocol B. Thus, the first and second STAs 40, 42 may communicate with the AP 30 simultaneously over the same RF channel, each STA 40, 42 using its own respective wireless protocol and set of subcarrier frequencies. For example, a first RF signal from the first STA 40 may be split into a plurality of first subsignals for transmission over the first set of subcarrier frequencies $f_A$. That is, according to the illustrative example, the first RF signal from the first STA 40 in the first wireless protocol A is divided into 192 first subsignals, each transmitted over one of the subcarrier frequencies $f_2 \ldots f_4, f_6 \ldots f_8, f_{10} \ldots f_{12}, \ldots, f_{254} \ldots f_{256}$. Simultaneously, a second RF signal from the second STA 42 may be divided into 64 second subsignals, each transmitted over one of the subcarrier frequencies $f_1, f_5, f_9, f_{13}, \ldots, f_{253}$. Thus, the first and second STAs 40, 42 may communicate with the AP 30 utilizing their respective wireless protocols over the same RF channel at a same time.

Those of skill in the art will understand that a similar process may be executed if the first number X is less than the second number Y. In step 315, the RF channel is divided into a number of subcarrier frequencies equal to the second number Y. In step 316, a second quotient $Z_2$ is obtained to determine a spacing between subcarrier frequencies utilizing the first wireless protocol A and those utilizing the second wireless protocol B. The second quotient $Z_2$ is generated by dividing the second number Y by the first number X. In step 318, the first wireless protocol A is assigned the first set of subcarrier frequencies $f_A$. Beginning with a first subcarrier frequency $f_1$ within the RF channel, the second quotient $Z_2$ is added to the first subcarrier frequency $f_1$ in order to calculate a subsequent subcarrier frequency $f_{1+Z}$. Thus, the first set of subcarrier frequencies $f_A$ begins with $f_1, f_{1+Z}, f_{1+2Z}$, and $f_{1+3Z}$, and ends with $f_{1+(X-1)Z}$. In step 320, the second protocol B is assigned the second set of subcarrier frequencies $f_B$, which includes each of the subcarrier frequencies within the RF channel not assigned to the first wireless protocol A. Beginning with a second subcarrier frequency $f_2$ within the frequency channel, the second set of subcarrier frequencies $f_B$ begins with $f_2 \ldots f_Z, f_{Z+2} \ldots f_{2Z}$, and $f_{2Z+2} \ldots f_{3Z}$, and ends with $f_{(X-1)Z+2} \ldots f_Y$.

Those skilled in the art will understand that there are many ways in which to assign the subcarrier frequencies to the corresponding wireless protocols. Similarly, the method 300 of assigning the subcarrier protocols may take into account, the predetermined bandwidth of the RF channel, a number of wireless protocols being utilized on the RF channel, a number of subcarrier frequencies utilized by each of the wireless protocols, etc. Although, the exemplary embodiment of the method 300 evenly-spaces the subcarrier frequencies in the first and second sets, those of skill in the art will understand that some or all of the subcarrier frequencies may not be evenly-spaced. For example, in another embodiment of the illustrative example described above, in step 312, the second set of subcarrier frequencies $f_B$ may be $f_1$-$f_{64}$, while the first set is $f_{64}$-$f_{256}$. In this manner, the first quotient $Z_1$ need not be calculated.

In a further exemplary embodiment of the present invention, a modification may be made to a physical ("PHY") layer of the wireless protocol(s) which would divide the RF channel into a smaller number of subcarrier frequencies (e.g., the second wireless protocol B in the illustrative example) than the wireless protocol which would divide the RF channel into a greatest number of subcarrier frequencies (e.g., the first wireless protocol A in the illustrative example). Although, the illustrative example describes a modification of the PHY layer of only the second wireless protocol B, when more than two wireless protocols will be utilized on the RF channel, the PHY layer of each of the smaller protocols will be modified. For example, in one embodiment, the 802.11a, 802.16d and 802.16e protocols may be utilized on the RF channel. Thus, the PHY layers of the 802.11a and 802.16d protocols will be modified. The 802.16e protocol may remain substantially unchanged, except that it may not transmit on certain subcarrier frequencies (e.g., those reserved for the 802.11a and 802.16d protocols). The modification to the PHY layer may be made subsequent to executing the steps of the method 300.

Figure 4A:
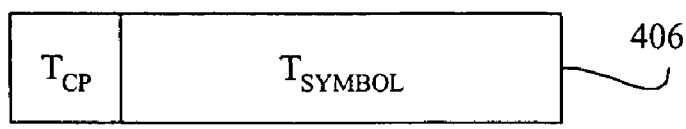
FIG. 4a shows a conventional 802.11a physical layer.

FIG. 4a shows a conventional OFDM symbol 402 which is transmitted on the PHY layer according to the 802.11a protocol. The conventional symbol 502 has a duration consisting of a cyclic prefix ("$T_{CP}$") 404 followed by a symbol time ("$T_{SYMBOL}$") 406. Those of skill in the art understand that the cyclic prefix 404 includes a repetition of a predetermined portion of data transmitted in the symbol time 406. The cyclic prefix 404 is generally utilized to counter a multi-path effect (e.g., multi-path fading). That is, multiple versions of the signal may reach a destination after being reflected from different objects. The symbol time 406 is defined as an inverse of the bandwidth of the RF channel divided by the number of subcarrier frequencies that the RF channel would be divided into using the single wireless protocol. Thus, in the conventional symbol 402, the cyclic prefix 404 is 0.8 microseconds and the symbol time 406 is 3.2 microseconds (e.g., 1/(20 Mhz/64)).

In the conventional network, use of more than one wireless protocol on the same RF channel would cause interference on the subcarrier frequencies which are used to transmit wireless protocols requiring less than the total number of available subcarrier frequencies in the RF channel (e.g., the 802.11a protocol). Thus, according to the present invention, increasing the duration of a period of the symbol (e.g., the symbol time) in these subcarrier frequencies may prevent interference to them from adjacent subcarrier frequencies utilized by one or more other wireless protocols. This enables proper signal demodulation and reassembly of original data transmitted over these subcarrier frequencies. Also, according to the present invention, the PHY layer of the wireless protocol which utilizes a greatest number of subcarrier frequencies may be unchanged (e.g., the 802.16d/e protocol).

Figure 4B:
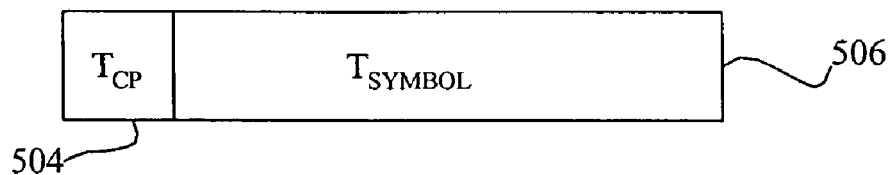
FIG. 4b shows an exemplary embodiment of a physical layer according to the present invention.

An exemplary embodiment of a first symbol 502 utilized by the 802.11a protocol according to the present invention is shown in FIG. 4b. In this embodiment, the first and second wireless protocols A and B are the 802.16d protocol and the 802.11a protocol, respectively. In this manner, the first symbol 502 has a first symbol duration comprising a first cyclic prefix 504 and a first symbol time 506. In this embodiment, the first cyclic prefix 504 may be about 0.8 microseconds, similar to the conventional cyclic prefix 404. Those of skill in the art will understand, that the first cyclic prefix 504 may be determined as a function of the multipath environment. For example, if the 802.11a protocol is used for transmission up to about 100 meters, the first cyclic prefix 504 may be used. However, as will be described below, if the 802.11a protocol is used for transmission to about 1000 meters, then the cyclic prefix may be increased.

The first symbol time 506 may be defined as an inverse of the bandwidth of the RF channel divided by the number of subcarrier frequencies that the RF channel would be divided into by the wireless protocol which utilizes the greater number of subcarrier frequencies. Thus, the first symbol time 506 would be 12.8 microseconds (e.g., 1/(20 MHz/256)). Therefore, the first symbol duration would be longer than the conventional duration (e.g., 3.2 microseconds). This prevents any interference to the first set (802.11a) of subcarrier frequencies $f_A$ from the second set (802.16d) of subcarrier frequencies $f_B$. No changes are needed to an 802.16d symbol duration. Further, the duration of the first cyclic prefix 504 may generally depend on a multi-path environment, and, thus, has no correlation with the symbol time. Generally, an effect of an increased delay in an echo (e.g., multipath reflection) of an RF signal is mitigated by an increased cyclic prefix.

Figure 4C:
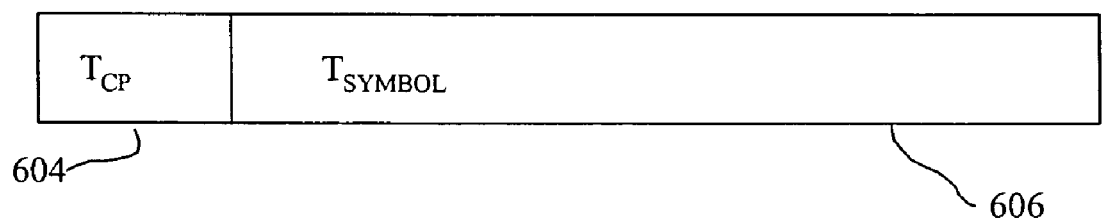
FIG. 4c shows a further exemplary embodiment of the physical layer according to the present invention.

Another exemplary embodiment of a second symbol 602 according to the present invention is shown in FIG. 4c. In this embodiment, the first and second wireless protocols A and B are the 802.16e protocol and the 802.11a protocol, respectively. In this manner, the second symbol 602 has a second symbol duration comprising a second cyclic prefix 604 and a second symbol time 606. In this embodiment, the second cyclic prefix 504 may be about 0.8 microseconds, similar to the conventional cyclic prefix 404. Alternatively, the second cyclic prefix 504 may be extended to a further value (e.g., greater than 0.8 microseconds) if the multipath environment results in delayed echoes (i.e., multipath reflections) of the RF signal. Because the second duration is longer than the conventional duration, the second symbol 602 may tolerate worse multipath environments than the conventional symbol 502.

Further, in the embodiment shown in FIG. 4c, the second symbol time 606 is defined as an inverse of the bandwidth of the RF channel divided by the number of subcarrier frequencies that the RF channel would be divided into by the wireless protocol which utilizes the greater number of subcarrier frequencies. Thus, the second symbol time 606 would be 102.4 microseconds (e.g., 1/(20 MHz/2048)). Therefore, the second symbol duration is longer than the conventional duration (e.g., 3.2 microseconds). As a result, transmission of the same amount of data takes longer than it did in the conventional 802.11a PHY layer. Further, according to the present invention, the symbol time of each of the smaller protocols may be adjusted as described herein. For example, in an embodiment wherein the 802.11a, 802.16d and 802.16e protocols are utilized on the RF channel, the symbol times of the 802.11a and 802.16d protocols would be increased to 102.4 microseconds (e.g., 1/(20 MHz/2048)). Extending the symbol times may decrease interference between adjacent subcarrier frequencies.

In yet a further exemplary embodiment of the present invention, a modification may be made to a media access control ("MAC") layer. In this embodiment, the modification is made to the wireless protocol (e.g., the 802.11a protocol) if it is used for the point-to-point communication (e.g., between the first STA 40 and the AP 30, between the AP 30 and a further computing device (i.e., a backhaul)). If, for example, the 802.11a protocol is used for the point-to-multipoint communication, then the modification may not be utilized. The modification to the MAC layer may be made subsequent to executing the steps of the method 300 (i.e., modification of the PHY layer).

Figure 5A:
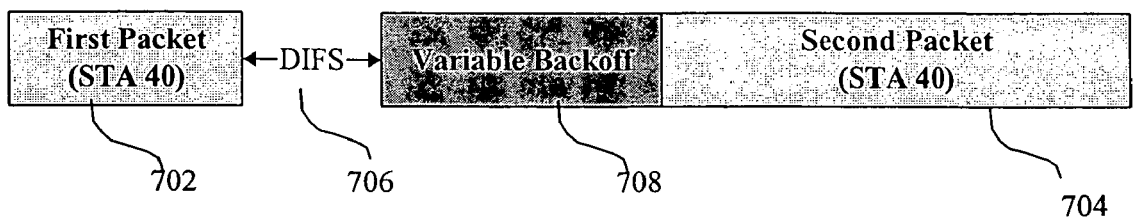
FIG. 5a shows a conventional 802.11a media access control layer.

FIG. 5a shows a transmission of a first data packet 702 and a second data packet 704 from the first STA 40 according to the conventional 802.11a protocol. As understood by those of skill in the art, after the first packet 702 is transmitted, the first STA 40 waits for a conventional distributed coordination function ("DCF") interframe space ("DIFS") 706. Those of skill in the art will understand that, in further embodiments, the first STA may wait for a point coordination function ("PCF") interframe space ("PIFS").

After waiting for the DIFS 706, the first STA 40 performs a conventional variable backoff 708 prior to attempting transmission of the second data packet 704. The variable backoff 708 is a first random time (e.g., a plurality of time slots) for which the first STA 40 waits before reassessing the RF channel. During the first random time, other STAs (e.g., the second STA 42, the AP 30, etc.) may transmit over the RF channel. When the random time has expired, the first STA 40 determines if the RF channel is free (e.g., no other STAs or the AP transmitting thereon). If the RF channel is free, the first STA 40 transmits the second data packet 704. However, if the RF channel is busy, the first STA 40 waits for a second random time (e.g., generated independently of the first random time) until it expires before reassessing the channel.

Figure 5B:
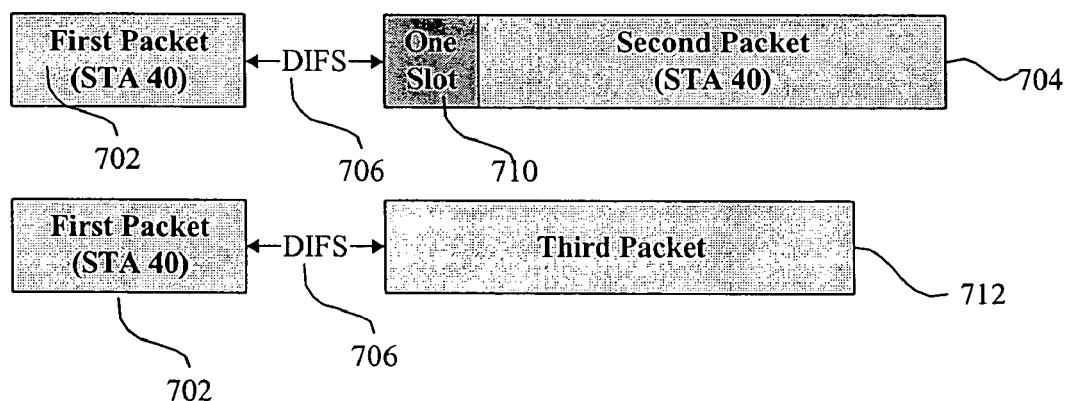
FIG. 5b shows an exemplary embodiment of a media access control layer according to the present invention.

FIG. 5b shows a transmission of the first data packet 702 and the second data packet 704 according to a modified 802.11a protocol. As stated above, the modification may be made to the MAC layer of the 802.11a protocol. After transmitting the first data packet 702, the first STA 40 waits for the conventional DIFS 706 (or PIFS). After the DIFS 706, the first STA 40 performs a backoff 710 (e.g., a predetermined number of time slots). In a preferred embodiment, the predetermined number is a single time slot. Thus, when the predetermined number of time slots has passed, the first STA 40 assesses the RF channel. While the first STA 40 is waiting for the predetermined number of time slots to pass, the AP 30 may transmit a third data packet 712. If, however, the RF channel is free after the predetermined number of slots has passed, the first STA 40 may transmit the second data packet 704. Thus, according to the present invention, both endpoints (e.g., STAs, APs, etc.) participating in the PTP communication may implement the modification to the MAC layer.

Figure 6:
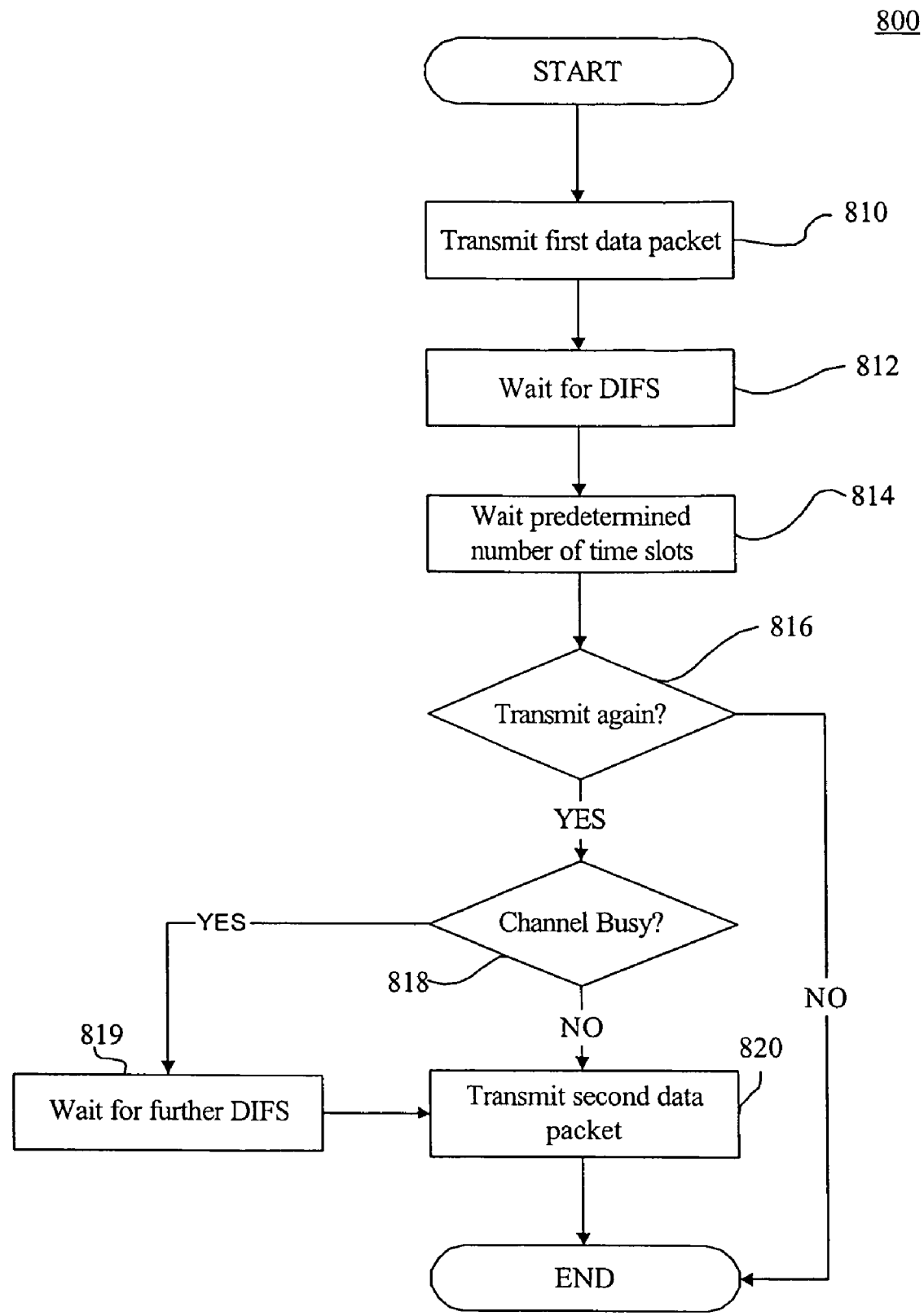
FIG. 6 shows an exemplary embodiment of a method for wireless communication according to the present invention.

FIG. 6 shows an exemplary embodiment of a method 800 which implements the modification to the MAC layer according to the present invention. In step 810, the first STA 40 transmits the first data packet 702 to the AP 30. Although, the method 800 will be described with respect to the first STA 40, those of skill in the art will understand that the method 800 may be implemented by any device which conducts wireless communication. For example, during the transmission of a data packet by a particular STA or AP, no other wireless device (e.g., STA, AP, etc.) may transmit over the set of subcarrier frequencies utilized thereby. For example, according to the MAC layer modification, each endpoint (e.g., the first STA 40 and the AP 30) in the PTP communication has exclusive access to the corresponding set of subcarrier frequencies (e.g., the second set of subcarrier frequencies $f_{B)}$.

In step 812, the first STA 40 waits for the DIFS 706 after transmitting the first data packet 702. Immediately after the DIFS 706, the AP 30 may have begun transmitting the third data packet 712. In step 814, the first STA 40 waits for the predetermined number of time slots after the DIFS 706.

In step 816, the first STA 40 determines whether the second data packet 704 is prepared for transmission. If the first STA 40 does not have the second data packet 704, the first STA 40 may go into a sleep mode or remain idle while actively monitoring the RF channel. Thus, the first STA 40 may reassess the RF channel when it generates the second data packet 704.

In step 818, the first STA 40 assesses the RF channel to determine whether it is free. If the RF channel is busy, it implies that the first STA 40 is receiving a packet from the AP 30, because there are only two devices (e.g., the first STA 40 and the AP 30) participating in the PTP communication. After the packet has been received, the first STA 40 waits for a further DIFS (step 819) and transmits the second packet 704, if it has one ready, to the AP 30. Meanwhile, the AP 30 waits for the same predetermined number of slots following the DIFS before transmitting its next packet. In one embodiment, the predetermined number of slots does not change with time.

In step 820, the RF channel is free, so the first STA 40 transmits the second data packet 704. After the second data packet 704 has been transmitted, the first STA 40 may return to step 814 if it has any further data packets, or it may enter a sleep mode or remain idle while monitoring the RF channel.

In one embodiment, the present invention may be used, for example, to deploy a WiMAX protocol at a front end of a communications network to provide broadband access to multiple end users while deploying a Wi-Fi protocol at a back end of the communications network to provide a primary or secondary backhaul for broadband data exchanged with the end users. In other embodiments, a Wi-Fi protocol may be deployed at the front end while a WiMAX protocol is deployed at the back end. In yet further embodiments, both a Wi-Fi and a WiMAX protocol may be deployed at either the front end or the back end.

It will also be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:

comparing a plurality of wireless protocols utilized on a radio frequency channel, each wireless protocol utilizing a corresponding predetermined number of subcarrier frequencies on the channel;

generating a number as a function of a comparison of the corresponding predetermined numbers;

dividing the frequency channel by the number to generate a set of subcarrier frequencies;

assigning each of the wireless protocols a corresponding subset of subcarrier frequencies; and conducting wireless communication over each subset of subcarrier frequencies utilizing the corresponding wireless protocol during a same time period.

2. The method according to claim 1, wherein at least one of the wireless protocols is used for a point-to-point communication and at least one of the remaining wireless protocols is used for a point-to-multipoint communication.

3. The method according to claim 1, wherein each of the wireless protocols utilizes an orthogonal frequency division multiplexing technique.

4. The method according to claim 1, wherein the generating step includes the following substep:

determining a first wireless protocol from the plurality of wireless protocols utilizing a greatest number of subcarrier frequencies; and using the greatest number as the number.

5. The method according to claim 1, wherein a number of subcarrier frequencies in each subset is no greater than the predetermined number of subcarrier frequencies utilized by the corresponding wireless protocol assigned to the subset.

6. The method according to claim 1, wherein the assigning step further comprises:

beginning with a first subcarrier frequency in the set, reserving a plurality of further subcarrier frequencies for the corresponding wireless protocol, each of further subcarrier frequencies being a predetermined space away from the first subcarrier frequency.

7. The method according to claim 6, wherein the predetermined space is determined as a function of the predetermined number of subcarrier frequencies utilized by a corresponding wireless protocol and a total number of subcarrier frequencies in the set.

8. The method according to claim 1, wherein the conducting step further comprises:

dividing a signal into a predetermined number of subsignals, the predetermined number no greater than a number of subcarrier frequencies in the subset; and transmitting each subsignal on a corresponding subcarrier frequency in the subset.

9. The method according to claim 1, further comprising:

determining a first wireless protocol from the plurality of wireless protocols utilizing a least predetermined number of subcarrier frequencies; and modifying a symbol time of the first wireless protocol as a function of a bandwidth of the channel and a total number of subcarrier frequencies in the set.

10. The method according to claim 9, further comprising:

increasing a duration of a cyclic prefix of the wireless protocol.

11. The method according to claim 9, wherein the symbol time equals an inverse of the bandwidth of the channel divided by the total number of subcarrier frequencies in the set.

12. The method according to claim 9, further comprising:
when the first wireless protocol is a protocol used for a point-to-point communication, performing the following substeps:
  transmitting, by a first wireless station, a first data packet;
  waiting for a distributed coordination function interframe space ("DIFS");
  waiting for a predetermined time;
  when the predetermined time expires, determining whether any further wireless station is transmitting a further data packet on the channel;
  when there is no further data packet being transmitted on the channel, transmitting a second data packet.

13. The method according to claim 12, further comprising:
when the further data packet is being transmitted on the channel, waiting for a further predetermined time; and
transmitting the second data packet.

14. The method according to claim 12, wherein the predetermined time is a single time slot.

15. A system, comprising:
a first wireless device utilizing a first wireless protocol utilizing a first predetermined number of subcarrier frequencies on a radio frequency channel; and
a second wireless device utilizing a second wireless protocol having a second predetermined number of subcarrier frequencies on the channel,
wherein, one of the first and second wireless devices compares the first wireless protocol to the second wireless protocol, generates a number as a function of a comparison of the first and second predetermined numbers, divides the channel by the number to generate a set of subcarrier frequencies, assigns the first wireless protocol to a first subset of subcarrier frequencies and assigns the second wireless protocols to a second subset of subcarrier frequencies, and
wherein, during a same time period, the first wireless device conducts wireless communications over the first subset of subcarrier frequencies utilizing the first wireless protocol and the second wireless devices conducts wireless communications over the second subset of subcarrier frequencies utilizing the second wireless protocol.

* * * * *